April 16, 1957 R. W. LINDGREN 2,788,731
SUBSOIL CULTIVATING DEVICE
Filed Nov. 16, 1953 2 Sheets-Sheet 1

INVENTOR.
Robert W. Lindgren
BY
ATTORNEY

April 16, 1957 R. W. LINDGREN 2,788,731
SUBSOIL CULTIVATING DEVICE
Filed Nov. 16, 1953 2 Sheets-Sheet 2
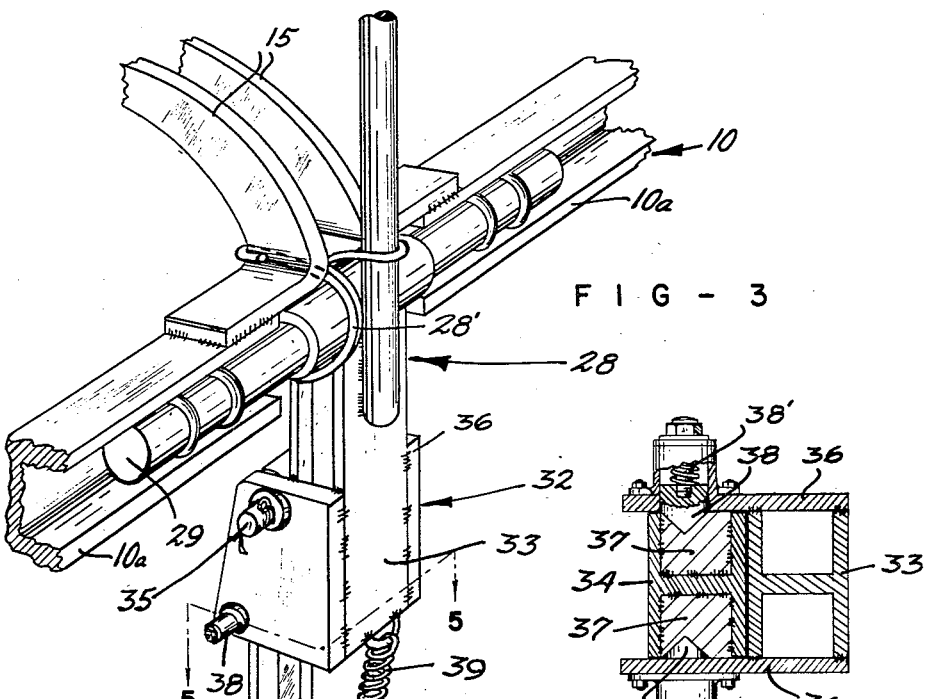
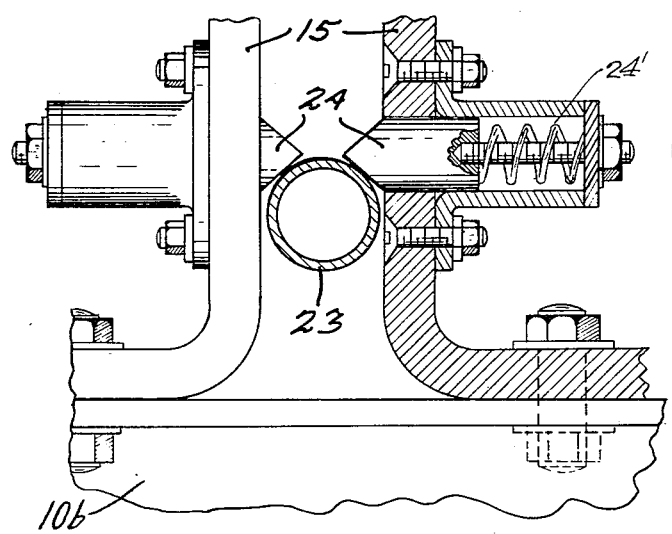
INVENTOR.
Robert W. Lindgren
BY
Glenn L. Fish
ATTORNEY United States Patent Office 2,788,731
Patented Apr. 16, 1957

2,788,731
SUBSOIL CULTIVATING DEVICE
Robert W. Lindgren, Mansfield, Wash.
Application November 16, 1953, Serial No. 392,339
2 Claims. (Cl. 97—47.89)

This invention is a subsoil cultivating device particularly adapted to automatically remove the subsoil implement upon contacting an obstruction of a magnitude liable to damage the device.

One object of the invention lies in the provision of a tillage device adapted to automatically remove from the soil, the subsoil implement upon its encountering an obstacle.

Another object of the invention lies in the provision of a tillage device having a pressure sensitive subsoil implement operably connected to a vertically tiltable jack lever adapted to lift the device sufficiently to remove the implement from the soil upon an obstruction being encountered by the implement.

Another object of the invention lies in the provision of a subsoil implement having an actuable jack lever adapted to lift the device and remove the subsoil implement from the soil and having a pressure sensitive break joint effecting return of the jack lever to its normal position.

These and other objects of the invention will become apparent during the course of the following description.

In the accompanying drawings, forming a part of this specification, and in which like numerals are employed to designate like parts:

Figure 3 is an enlarged fragmentary perspective view showing a portion of the jack lever and frame;

Figure 4 is a fragmentary enlarged vertical view as at line 4—4 of Figure 1; and Figure 5 is a horizontal cross section as at line 5—5 of Figure 3.

Figure 1:
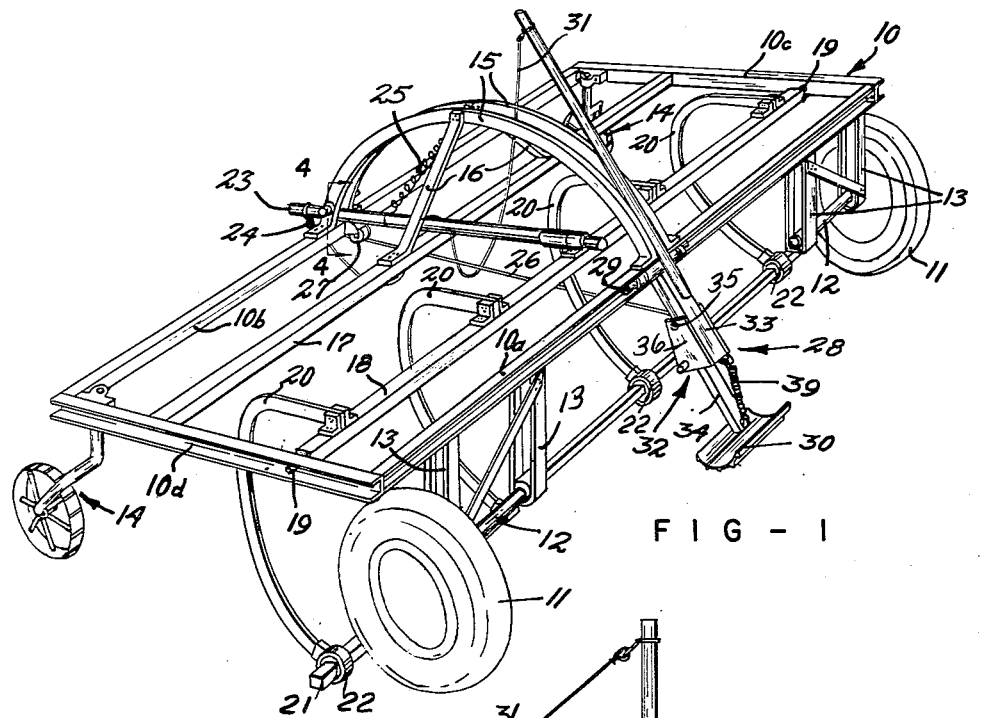
Figure 1 is a perspective view of a tillage device incorporating the structure of this invention.

Referring now more particularly to the drawings, I have shown the device as including a mobile frame 10 having its longitudinal dimension extending transversely of the normal direction of movement of the device and front and rear frame members 10a and 10b and end bar members 10c and 10d. The frame is provided at its forward corners with supporting wheels 11—11 suitably journaled on shafts 12—12 carried by depending legs 13 welded or otherwise secured to the frame members 10. At the rear corners the frame 10 is provided with caster type wheels 14—14 thus providing a tillage device which may be drawn by a towing vehicle through employing a suitable draw bar, cable or chain (not shown).

The frame is provided with a pair of spaced vertically disposed arcuate guides 15—15 extending from the front frame member 10a to the rear frame member 10b and each is braced against tilting movement longitudinally of the frame by means of angle braces 16 supported on a longitudinally extending brace bar 17 secured at its ends to the end bar members 10c and 10d.

Spaced forwardly from the longitudinal median line of the frame 10 I have provided a rockable implement bar 18 extending longitudinally of the frame and having its ends journaled at 19 in the end bar members 10c and 10d. The implement bar is provided with conventional goose necks 20 which are common in implements of the type disclosed and which support a longitudinally extending subsoil implement or rod 21 which is normally rotatable in bearings 22 carried at the lower end of the goose necks 20. Means (not shown) are provided for rotating the rod for assisting in cultivation in the same manner as conventional rod weeders or operating other implements which may be supported from the implement bar 18. Midway the length of the frame and extending at right angles from the implement bar in a normally horizontal position is an arm 23 which is vertically tiltable between the guides 15 as the implement bar 18 rocks. The arm 23 is yieldably held in its normal horizontal position by means of spring biased latches 24 and a tension spring 25 is secured to the arm 23 and to the guide members 15 and biases the arm for upward tilting movement.

As the tillage device is moved forwardly the rotating rod 21 beneath the soil of the field being tilled breaks the roots of weeds and deposits the weeds on top of the surface of the soil where they will be killed by the sun. However, in many instances the implement 21 contacts rocks or other obstacles. In conventional structures the normal means of preventing destruction or damage to the implement or tillage device is to provide a releasable hitch which releases the device from the towing vehicle upon its striking an obstacle sufficiently large to damage a part of the device. Throughout a work day this consumes much time in re-hitching the device to the towing vehicle and slows the operation of tilling a field to such an extent that the expense of so doing is almost too great to be practical. This invention seeks to overcome this undesirable feature by providing a device which is self actuating to remove the implement from the soil and permit it to pass over an obstacle and again reenter the soil, thus eliminating the necessity of stopping and re-hitching the device and its towing vehicle.

When an obstacle strikes the implement 21, rearward pressure is applied to urge the implement bar 18 to rotate about or rock in the journals 19 and this in turn urges the arm 23 to tilt vertically from its normal horizontal position. When the tilting pressure of the arm 23 is sufficient to depress the springs 24' of the latches 24 it is released from the latches and the tension spring 25 causes it to rapidly rock the implement bar 18 thus shifting the implement rearwardly from the obstruction with which the implement is in contact. As the arm 23 tilts vertically (broken line position of Figure 2) cable 26 is pulled rearwardly over a pulley 27 and since the cable 26 is secured at its forward end to a vertically tiltable jack lever 28, upward movement of the arm 23 causes the jack lever to be tilted downwardly to engage its shoe 30 with the ground.

Figure 2:
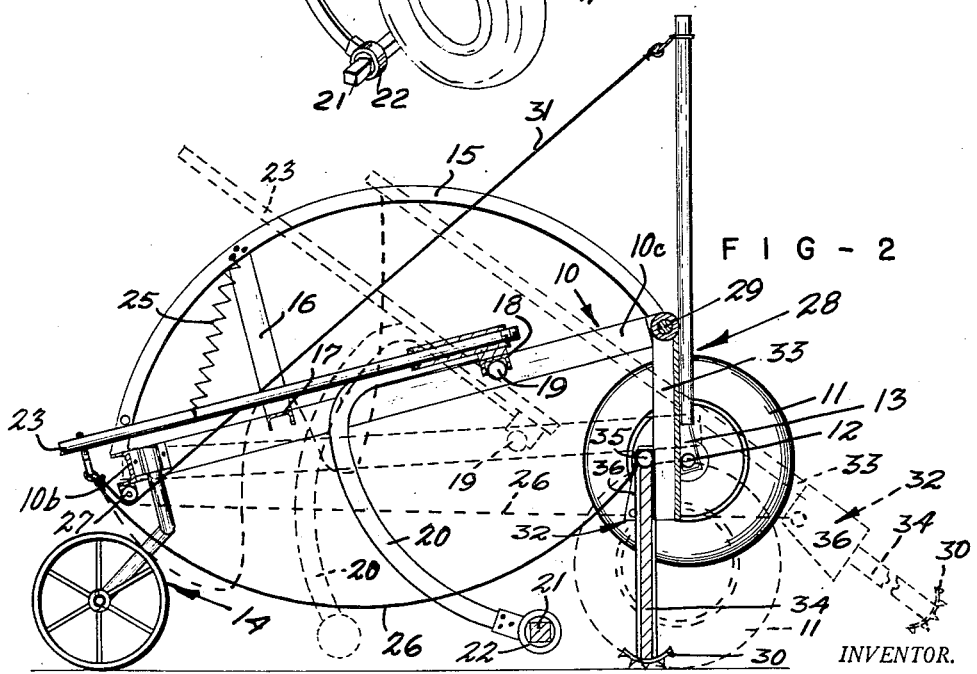
Figure 2 is a vertical cross section taken parallel with the normal direction of movement of the device.

Substantially midway its length, the jack lever is journaled on a horizontally disposed longitudinally extending journal pin 29 secured to the frame member 10a and therefore the plane of tilt of the jack lever 28 is parallel with the direction of movement of the tillage device. A return spring 28' maintains the leg in normal position with its shoe 30 clear of the surface of the soil. The cable 26 is secured to the jack leg intermediate the journal pin 29 and the jack legs lower ground engaging shoe 30. As the arm 23 raises, pull on the cable 26 causes the jack lever to tilt downwardly to engage the shoe 30 with the surface of the ground whereupon forward pull of the tillage device causes the jack lever to lift the frame 10 at its forward bar 10a and lift the wheels 11 from the ground thus providing sufficient clearance for the subsoil implement to clear the obstacle and again return to its normal position relative to the frame above the surface of the ground while the frame is supported as indicated in Figure 2. This return movement of the subsoil implement 21 is effected by means of a cable 31 secured to the upper end of the jack lever 28 above the pivot pin 29. The cable 31 has its rearward end secured to the arm 23 and passes under the pulley 27 and therefore as the jack lever 28 reaches its extreme lifting position wherein it is disposed in a substantially vertical plane the cable 31 has effectively lowered the arm 33 past the latches 24 where it is yieldably confined.

The lower portion of the jack leg 28 is provided with a break joint 32, which is detailed in Figures 3 and 5, and the break joint is formed with two normally axially parallel leg portions 33 and 34 having their end portions in overlapping relation. The lower leg portion 34 is pivotally united with the upper portion 33 by means of a pivot pin 35 which extends through rearwardly disposed plates 36 welded to the upper leg portion 33 thus permitting rearward pivotal movement of the lower portion 34 relative to the upper portion 33. The lower portion 34 is provided with keeper blocks 37 welded or otherwise secured therein and these keeper blocks are adapted to cooperate with latches 38 which are similar or identical in construction to the latches 24 thus the lower portion of the lifting jack lever is yieldably pivoted to the upper leg portion 33. The tension of the springs 38' is sufficient to maintain the two leg portions 33 and 34 in juxtaposition until such time as the jack lever has reached its vertical lifting position and lowered the arm 23 to its normal horizontal position whereupon the tension of cable 31, because it can pull the arm 23 no further, becomes great enough to cause the forward movement of the tillage device to break the joint 32 causing the lower portion 34 to swing rearwardly and permit return of the jack lever 28 to its normal position as shown in full line of Figure 1 and dotted line of Figure 2 whereupon the lower leg portion 34 is successively swung forwardly by means of spring 39 and again secured by the latches 38.

It is thus easily seen that I have provided a tillage device adapted to towed by a tractor or other towing vehicle which is not released from the towing vehicle upon striking an obstruction, but which is adapted to lift the subsoil implement from the soil over the obstruction, return it to its normal position relative to the frame and then lower the device so that the implement again enters the soil to continue its tillage operation.

Having thus described my invention, I claim:

1. In a towable tillage device having at least one implement carried by a wheeled supporting frame, the combination with a rockable implement bar extending transversely of the tilling movement of said device and journaled on said frame and normally supporting said implement for subsoil operation; said implement bar having a normally horizontal vertically tiltable arm rigidly secured to said implement and extending rearwardly therefrom at right angles to its axis; means yieldably holding said arm in its normal position; of a vertically tiltable jack lever journaled on said frame at the transverse weight center thereof; a pressure sensitive break joint intermediate the journal and the ground engaging lower end of said jack lever; cable means secured intermediate said arm and said jack lever for lowering said jack lever as said arm tilts upwardly; and other cable means secured at opposed ends to said arm and said jack lever for returning said arm to its normal position as the jack lever approaches its lifting movement extreme; said pressure sensitive break joint being adapted to break at the lifting extreme of said jack lever and effect return of said lever to its normal position.

2. In a towable tillage device having a mobile supporting frame; at least one subsoil implement carried by said frame and vertically tiltable with relation to the frame about a substantially horizontal axis extending transversely of the movement of said device; means yieldably holding said implement in normal soil working position and sensitive to pressure on said implement for release thereof to effect vertical tilting movement rearwardly from an obstacle out of the soil; and means dependent upon movement of said device relative to the soil for power to return the implement to its normal soil working position.

References Cited in the file of this patent
UNITED STATES PATENTS

| | | |
|---|---|---|
| 987,696 | Cairncross | Mar. 28, 1911 |
| 1,030,282 | Clancy | June 25, 1912 |
| 1,073,759 | Huck | Sept. 23, 1913 |
| 1,079,695 | Ehrlich | Nov. 25, 1913 |
| 1,691,233 | Ehrlich | Nov. 13, 1928 |
| 2,535,441 | McGehee | Dec. 26, 1950 |